United States Patent

[11] 3,607,133

[72] Inventors Osamu Hirao
Tokyo;
Tsutomu Kato, Hamamatsu-shi, both of, Japan
[21] Appl. No. 867,494
[22] Filed Oct. 20, 1969
[45] Patented Sept. 21, 1971
[73] Assignee Kachita Co., Ltd.
Hamamatsu-shi, Shizuoka-ken, Japan
[32] Priority Oct. 23, 1968
[33] Japan
[31] 43/76805

[54] APPARATUS FOR REMOVING CARBON MONOXIDE FROM ROOM AIR AND EXHAUST GAS
10 Claims, 4 Drawing Figs.
[52] U.S. Cl. ................................................ 23/288 F,
23/2 E, 23/2 S, 23/4, 23/288 E, 55/179, 55/278, 55/390, 55/400, 55/DIG. 30, 60/29
[51] Int. Cl. ................................................ B01j 9/06,
F01n 3/16

[50] Field of Search .......................................... 23/288.3 F, 288.3, 288.92, 2.1, 2.2, 4; 60/29, 30

[56] References Cited
UNITED STATES PATENTS
| | | | |
|---|---|---|---|
| 3,050,375 | 8/1962 | Bloch | 23/288 F |
| 3,109,715 | 11/1963 | Johnson et al. | 23/288 F |
| 3,159,450 | 12/1964 | Asker et al. | 23/288 F X |
| 3,295,919 | 1/1967 | Henderson et al. | 23/288 F X |
| 3,498,928 | 3/1970 | Cho et al. | 252/454 |

*Primary Examiner*—Joseph Scovronek
*Attorney*—Flynn and Frishauf

ABSTRACT: Apparatus for removing carbon monoxide continuously and efficiently from room air or automobile exhaust using an oxidizing catalyst containing a desiccative substance such as natural zeolite, active silica or active alumina includes a casing having a gas inlet and outlet on its lid section, and a slowly rotatable catalyst containing vessel of flat cylindrical shape closely disposed on the inner periphery of the casing. The air or gas to be purified passes over the catalyst twice, in opposite directions.

OSAMU HIRAO &
TSUTOMU KATO
INVENTORS 3,607,133

APPARATUS FOR REMOVING CARBON MONOXIDE FROM ROOM AIR AND EXHAUST GAS

CROSS-REFERENCE TO RELATED APPLICATION

This invention relates to that described in the copending Ser. No. 833,285, filed June 16, 1969, under the title "Method for Removing Carbon Monoxide From Air Exhaust Gas," and assigned to the same assignee as the instant application.

BACKGROUND OF THE INVENTION

This invention relates to apparatus for removing carbon monoxide contained in, for example, atmospheric air and exhaust gas released from an automobile engine, by catalytic oxidation of said carbon monoxide to harmless carbon dioxide.

One of the present inventors jointly with another coworker had previously invented a novel type of catalyst prepared by pelletizing a mixture of manganese oxide, copper oxide and fine powder of natural zeolite, mainly with the view of converting by oxidation the carbon monoxide contained in exhaust gas from an automobile engine to harmless carbon dioxide, as shown in the specifications of U.S. Pat. No. 3,436,356 issued on Apr. 1, 1969 and U.S. Pat. No. 3,498,928, issued on Mar. 3, 1970. These catalysts are not only adapted for treatment of said high temperature exhaust gas, but also display a catalytic action to oxidize carbon monoxide at normal temperature. Accordingly, they are effectively applicable in purifying the air in a room where there is fired an oil stove or the air in the interior seating space of an automobile.

However, it was found that, in air having a relative humidity of 70 percent and over, the natural zeolite mixed with the aforesaid catalyst components would be apt to adsorb moisture from the air and accordingly decrease its activity, and that, when the natural zeolite was saturated with adsorbed moisture, it would cause the activity of the catalyst to be almost lost. It was also discovered that in case the air had a relative humidity of less than 70 percent, the lower said humidity, the more prolonged the catalyst life.

The exhaust gas from an automobile engine may contain considerable amounts of moisture generated by the fuel combustion, but it has so elevated a temperature that the relative humidity of the gas is notably reduced, and the catalyst life is not so much affected as in the aforementioned case. However, it is most preferably to introduce moisture-free gas through the catalyst layer also in this case.

One of the present inventors jointly with another coworker had invented an improved method for removing carbon monoxide from room air and exhaust gas using granules of oxidation catalyst containing natural zeolite or the same combined with silica or alumina, which comprised introducing a gas containing carbon monoxide, moisture and oxygen through the catalyst chamber packed with the granules of said oxidation catalyst first in one direction for a certain length of time, then allowing said gas to flow in the opposite direction similarly for a certain length of time, and repeating continuously this gas passage operation.

Such a method is described in detail in the specification of copending U.S. Pat. application Ser. No. 833,285. Briefly, the natural zeolite, active alumina or active silica in the catalyst granules positioned at the front part of catalyst chamber adsorbs moisture in the incoming gas at a low temperature, and the dried gas enters the catalyst chamber at its middle part to cause carbon monoxide in the gas to be oxidized into carbon dioxide, with the resultant temperature rise of the gas by reaction heat. When after this reaction, the gas passes through the back part of the catalyst chamber, the moisture, which has already been adsorbed to the catalyst of the same kind packed at said part during the preceding gas passage in reverse direction, is desorbed from the catalyst by the high temperature of the passing gas. Of course, however, the catalyst granules themselves at the front and back parts of the chamber may be present as an oxidizing catalyst to a certain extent besides as a desiccant.

When the catalyst granules positioned at the front part of the chamber are almost saturated with adsorbed moisture, the direction of gas passage is reversed, and the catalyst layer at the middle part of the chamber will be continuously exposed to dried gas by repetition of such reversing operation.

As a means of reversing the gas direction, a four-way valve or a set of four switch valves was adopted in U.S. Pat. application Ser. No. 833,285. However, it has been found that the operation of these reversing means is troublesome.

An object of the present invention is to provide an automatically and continuously operable apparatus for removing carbon monoxide from, for example, room air and exhaust gas.

Another object of the present invention is to provide an apparatus suitable for carrying out the method described in the specification of U.S. Pat. application Ser. No. 833,285.

SUMMARY OF THE INVENTION

The apparatus of the present invention comprises a lid section having a gas inlet with preferably a first gas distributing inner space communicating therewith, a gas outlet with preferably a second gas distributing inner space communicating therewith, and a hole formed between said gas inlet and outlet for receiving a support shaft. Further provided is a bottom section fixed to the lid section to form a casing, the bottom section communicating the gas inlet with the gas outlet. A flat cylindrical vessel filled with oxidizing catalyst granules containing a desiccative substance, is mounted within the casing on a support shaft engaged in the hole in the lid section and the cylindrical vessel is rotated slowly along the inner periphery of the casing around the support shaft. Gas to be purified passes first through a portion of the cylindrical vessel in registration with the first gas distributing space, then through the bottom section, then through a portion of the rotating cylindrical vessel in an opposite direction to the inlet flow, and then out the gas outlet.

DETAILED DESCRIPTION OF THE INVENTION

Figure 1:
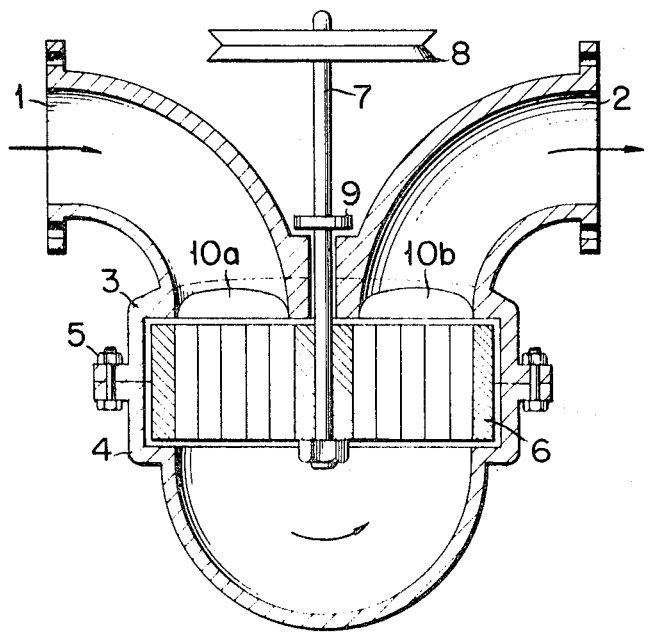
FIG. 1 is a longitudinal sectional view of the apparatus of the present invention.
Figure 2:
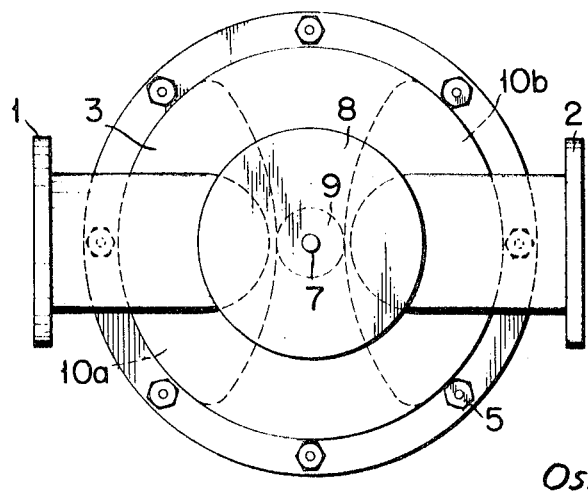
FIG. 2 is a plan view of FIG. 1.

As illustrated in FIGS. 1 and 2, there are fastened together by bolts and nuts 5 a lid section 3 having a gas inlet 1 connected to a pipe through which there flows gas streams to be purified, and a gas outlet 2 connected to an exhaust pipe, and an hemispherical bottom section 4 for reversing the direction of flow of the gas streams. In the joint of sections 3 and 4 is disposed a catalyst vessel 6 of flat cylindrical shape. A support shaft 7 fixed to the axial center of said vessel penetrates said lid section 3 upwardly to the outside. To the support shaft 7 is fixed a V-pulley 8 which rotates by connection with a suitable driving source (not shown). Numeral 9 represents a support ring to define the vertical position of said catalyst vessel 6 within the apparatus. While about one-third of the ceiling of the lid section 3 contacts the upper surface of the catalyst vessel 6, there are formed void spaces 10a and 10b allowing for the passage of gas streams spaced from each other on the right and left sides of the upper surface of said catalyst vessel 6.

There will now be described by reference to FIGS. 3 and 4 the construction of the flat cylindrical catalyst vessel 6 which is caused to slowly rotate in the apparatus. There are coaxially assembled a stainless steel pillar 12 perforated with an endwise bore 11 for allowing the support shaft 7 to be introduced therethrough so as to be fixed to the central part of said vessel, and a cylindrical peripheral wall 13 similarly made of stainless steel. At the base of said assembly is embedded a disc-shaped net 14 made of mechanically strong stainless steel wires, thereby allowing the pillar 12 and cylindrical peripheral wall 13 to be fixed in place by welding to the opposite sides of said wire net 14. Into a space between said pillar 12 and peripheral wall 13 is fitted a corrugated thin stainless steel board 15 closely wound in a spiral form. The narrow clearance defined on both sides of said corrugated board is packed with oxidizing catalyst granules 16 capable of adsorbing and desorbing moisture. Thereafter the upper surface of the catalyst vessel 6 is fitted with another disc-shaped wire net 17, which, however, is not fixed in place by welding in order to allow for replacement of catalyst granules. Once said catalyst layer is fitted into an actual automobile or the like, there is no need to replace it for at least one year, so that said upper wire net 17 may be securely welded to the catalyst vessel 6, if desire. When replacement of the catalyst is required, the vessel 6 and catalyst 16 may all be exchanged for new ones. This will save labor and will in most instances, be more convenient.

The aforementioned stainless steel catalyst vessel may be replaced by a similarly cylindrical porcelain vessel containing numerous longitudinal catalyst holes integrally formed therein. In such case, the top and bottom surfaces of the vessel may be covered with a light wire net, or after said longitudinal holes are packed with catalyst granules, may be solidified with a suitable heat resistant adhesive agent having sufficient breathability.

The catalyst vessel 6 filled with oxidizing catalyst is fitted into the subject apparatus, and then is allowed to rotate slowly, say, once every three minutes by properly driving the V-pulley 8 so as to introduce air containing moisture and carbon monoxide or similar exhaust gas mixed with air into said vessel through the gas inlet 1. The gas is conducted downward through a catalyst layer open to the space 10a of the lid section 3 into the bottom section 4. At this time, the moisture contained in the gas is adsorbed to the catalyst granules and part of the carbon monoxide included therein is also oxidized into carbon dioxide. Thereafter the gas is carried upward through another catalyst layer open to the space 10b of said lid section 3 to be discharged into the atmosphere through the exhaust pipe 2. While the gas passes though said catalyst layer, the carbon monoxide remaining therein is brought into contact with the catalyst granules to be oxidized into harmless carbon dioxide, generating heat of oxidation. Since the gas is already in a dry state, the moisture previously adsorbed to the catalyst granules is desorbed therefrom by the aid of the temperature rise of the catalyst itself to bring said granules to a dry state. Said dried catalyst layer is successively moved to the space 10a as a result of the rotation of the catalyst vessel 6. The subsequent continuous repetition of said cycle enables carbon monoxide to be efficiently removed from wet exhaust gas automatically and permanently.

The carbon monoxide removing apparatus according to the present invention is of simple construction and only requires its movable part to make a slow rotation, so that it is characterized by considerable ease in design manufacture and handling.

Figure 3:
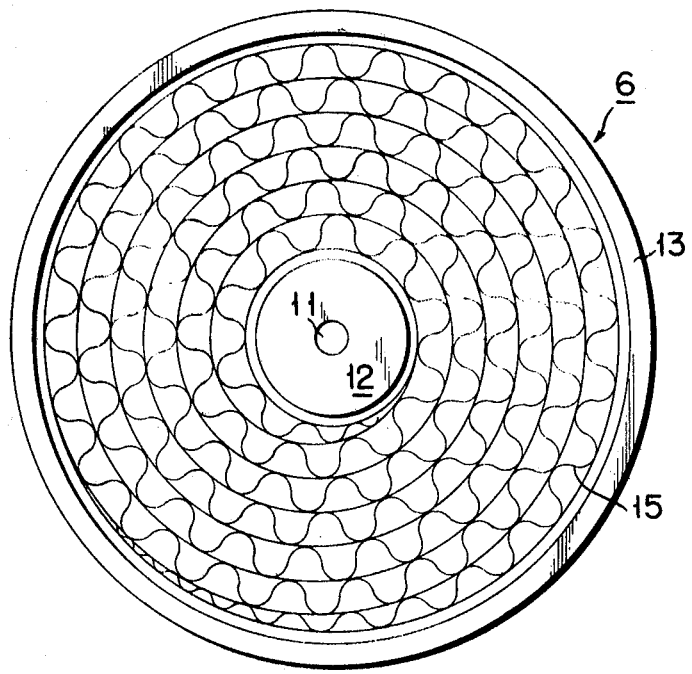
FIG. 3 is a plan view of a rotating catalyst vessel mounted in the apparatus of the present invention in a state not filled with a catalyst.
Figure 4:
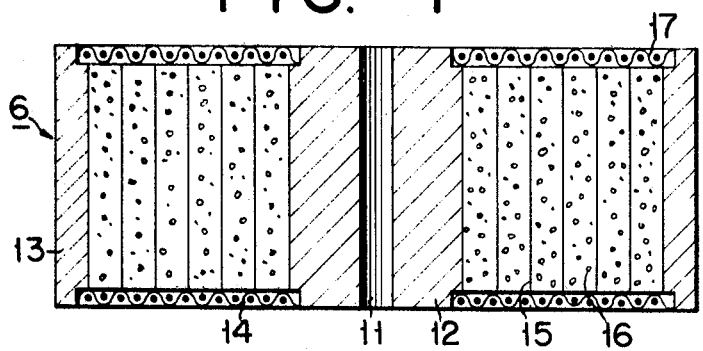
FIG. 4 is a longitudinal sectional view of FIG. 3 in a state filled with a catalyst.

Example:

There was prepared a catalyst vessel 30 cm. in outer diameter and 10 cm. high as shown in FIGS. 3 and 4, wherein there was tightly fitted a corrugated thin stainless steel board closely wound in a spiral form into the space between the peripheral wall 27 cm. in inner diameter and the central pillar 6 cm. in diameter. The space was packed with oxidizing catalyst granules prepared by the method disclosed in U.S. Pat. No. 3,436,356 issued on Apr. 1, 1969 (namely, catalyst granules formed by mixing fine powders consisting of 6 parts by weight of pure manganese oxide and 4 parts of pure copper oxide with fine powders of natural zeolite in substantially equal parts by weight thereto and molding the mass into granules 3 mm. in both diameter and height using a powerful press). The apparent volume of said catalyst layer was about 1.3 l.

Said catalyst vessel was fitted into the apparatus shown in FIGS. 1 and 2, and caused to rotate slowly once every three minutes. When air containing 1.0 percent of carbon monoxide and saturated with moisture at a temperature of 20° C. was continuously conducted through the apparatus at the rate of 180 l. per minute (space velocity was set at 8000 per hour), then the carbon monoxide content of the exhaust gas was maintained at 0.02 percent over a long period of more than 96 hours. Further tests indicated that there was no tendency for the carbon monoxide content to increase during further use.

What is claimed is:

1. Apparatus for removing carbon monoxide from a gas comprising:
   a casing including:
   a lid section having a gas inlet, and a gas outlet spaced from said inlet; and
   a bottom section coupled to said lid section to form said casing, said bottom section communicating said gas inlet with said gas outlet such that the gas flow through said inlet and outlet is in opposite directions;
   a flat cylindrical vessel filled with oxidizing catalyst granules containing a desiccative substance rotatably mounted within said casing such that gas to be purified flows in a first direction through said gas inlet, through a portion of the cylindrical vessel in registration with the gas inlet, through said bottom section whereby the direction of flow of the gas is reversed, through a different portion of said cylindrical vessel in registration with the gas outlet in an opposite direction to said first direction of flow, and then out the gas outlet; and
   means for slowly rotating said flat cylindrical vessel relative to said casing.

2. Apparatus as described in claim 1 wherein the desiccative substance mixed with the catalyst materials is selected from the group consisting of natural zeolite, active silica and active alumina.

3. Apparatus as described in claim 1 wherein the catalyst vessel houses therein a corrugated thin stainless steel board wound in a spiral form to divide the inner space of the vessel into a plurality of compartments.

4. Apparatus as described in claim 1 wherein the catalyst vessel is made of porcelain material and has a plurality of longitudinal holes for receiving catalyst granules.

5. Apparatus as described in claim 1 wherein the catalyst vessel is covered with a perforate material on the top and bottom sides thereof.

6. Apparatus as described in claim 5 wherein the perforate material is a wire net.

7. Apparatus according to claim 1 wherein said casing includes a hole formed therein between said gas inlet and said gas outlet; and comprising a support shaft rotatably received in said hole and coupled to said flat cylindrical vessel; said rotating means including means coupled to said support shaft for rotating said flat cylindrical vessel.

8. Apparatus according to claim 7 wherein said shaft includes a support ring coupled thereto and engaging said casing to support said shaft relative to said casing.

9. Apparatus according to claim 1 wherein said lid section includes a first gas distributing inner space communicating with said gas inlet and distributing gas to a first portion of said cylindrical vessel, and a second gas distributing inner space which is spaced from said first space and which communicates with said gas outlet for receiving gas from a second portion of said cylindrical vessel.

10. Apparatus according to claim 1 wherein said inlet and outlet are on opposite sides of said lid section.